United States Patent
Lee et al.

(10) Patent No.: US 11,144,305 B2
(45) Date of Patent: Oct. 12, 2021

(54) METHOD FOR UPDATING IC FIRMWARE

(71) Applicant: REALTEK SEMICONDUCTOR CORPORATION, Hsinchu (TW)

(72) Inventors: Chun-I Lee, Hsinchu (TW); Cong-Yu Zhang, Changshu (CN); Neng-Hsien Lin, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/921,980

(22) Filed: Jul. 7, 2020

(65) Prior Publication Data

US 2021/0019140 A1   Jan. 21, 2021

(30) Foreign Application Priority Data

Jul. 19, 2019  (CN) .......................... 201910655055.9

(51) Int. Cl.
  *G06F 8/654*   (2018.01)
  *G06F 8/65*    (2018.01)
  (Continued)

(52) U.S. Cl.
  CPC .............. *G06F 8/654* (2018.02); *G06F 8/61* (2013.01); *G06F 9/30189* (2013.01); *G06F 9/44505* (2013.01); *G06F 9/546* (2013.01)

(58) Field of Classification Search
  None
  See application file for complete search history.

(56) References Cited

U.S. PATENT DOCUMENTS

| 10,275,389 B2 | 4/2019 | Chen et al. |
| 2009/0153574 A1* | 6/2009 | Chou ............... G09G 5/003 345/531 |

(Continued)

FOREIGN PATENT DOCUMENTS

| TW | 200923902 A | 6/2009 |
| TW | I587124 B | 6/2017 |

OTHER PUBLICATIONS

OA letter of the counterpart TW application (appl. no. 108127118) mailed on Sep. 26, 2020. Summary of the OA letter: Claims 1, 2, 6, 9, 10 are unpatentable over the cited reference 1 (TW200923902A, also published as US20090153574A1) in view of the cited reference 2 (TWI587124, also published as U.S. Pat. No. 10,275,389B2).

*Primary Examiner* — Philip Wang
(74) *Attorney, Agent, or Firm* — WPAT, PC (57) ABSTRACT

Disclosed is an IC firmware update method performed by an intermediary circuit. The method includes: communicating with a target circuit to enter a predetermined mode; transmitting a status response message to a host circuit in response to a status asking message of the host circuit so as to inform the host circuit of its entrance to the predetermined mode; after the transmission of the status response message, receiving a first protocol request command of the host circuit; converting the first protocol request command into N request-end unstructured vendor defined message(s) (USVDM(s)) and transmitting the N request-end USVDM(s) to the target circuit to let it execute a firmware update operation, in which the N is a positive integer; receiving N response-end USVDM(s) of the target circuit related to the N request-end USVDM(s); and converting the N response-end USVDM(s) into a first protocol response command and transmitting it to the host circuit.

9 Claims, 11 Drawing Sheets

(51) Int. Cl.
  *G06F 9/54*    (2006.01)
  *G06F 8/61*    (2018.01)
  *G06F 9/30*    (2018.01)
  *G06F 9/445*   (2018.01)

(56) References Cited

U.S. PATENT DOCUMENTS

2016/0110305 A1*  4/2016  Hundal ................. G06F 13/387
                                                 710/316
2016/0217307 A1*  7/2016  Huang .................... G06F 3/061
2016/0306616 A1* 10/2016  Tomppo ................ G06F 9/4415
2017/0117719 A1*  4/2017  Su ............................. G06F 1/26
2017/0351638 A1* 12/2017  Chen .................... G06F 13/385
2018/0137897 A1*  5/2018  Shiau ................... G11C 7/1006
2020/0226087 A1*  7/2020  Sun ....................... H04N 5/765

* cited by examiner

Fig. 5 format of request-end USVDM for write operation format of response-end USVDM for write operation

Fig. 6 format of request-end USVDM for read operation format of response-end USVDM for read operation

METHOD FOR UPDATING IC FIRMWARE

BACKGROUND OF THE INVENTION

1. Field of the Invention

The present disclosure relates to an IC firmware update method, especially to an IC firmware update method using an unstructured vendor defined message (USVDM).

2. Description of Related Art

Regarding a USB Power Delivery (USB PD) IC using a USB Type-C interface, the most convenient way to update its firmware is executing a firmware update procedure through a USB Type-C port in accordance with the USB PD 3.0 protocol. If one would like to use other kinds of interfaces to update the firmware of this USB PD IC, she/he will encounter a lot of difficulties. For example, if one uses a System Management Bus (Smbus)/Inter-Integrated Circuit (I2C) bus or a conventional USB interface (i.e., non-USB Type-C interface) to execute the firmware update procedure for the USB PD IC, the execution of the firmware update procedure may fail because the USB PD IC may not support the above-mentioned interface.

Some USB PD IC doesn't support the USB PD 3.0 protocol but needs to update its firmware through the configuration channel (CC) of a USB Type-C interface; for this kind of USB PD ICs, a feasible firmware update method is necessary.

SUMMARY OF THE INVENTION

An object of the present disclosure is to disclose an IC firmware update method as an improvement over the prior art.

An embodiment of the IC firmware update method of the present disclosure is performed by an intermediary circuit. This embodiment includes the following steps: communicating with a target circuit to enter a predetermined mode; transmitting a status response message to a host circuit in response to a status asking message of the host circuit and thereby informing the host circuit of an entrance to the predetermined mode; after the status response message is transmitted, receiving a first protocol request command of the host circuit; converting the first protocol request command into N request-end unstructured vendor defined message(s) (USVDM(s)) and transmitting the N request-end USVDM(s) to the target circuit to let the target circuit perform a firmware update operation, in which the N is a positive integer; receiving N response-end USVDM(s) of the target circuit, in which the N response-end USVDM(s) is/are related to the N request-end USVDM(s); and converting the N response-end USVDM(s) into a first protocol response command and transmitting the first protocol response command to the host circuit.

Another embodiment of the IC firmware update method of the present disclosure is performed by a target circuit. This embodiment includes the following steps: communicating with a master-end circuit to enter a predetermined mode; receiving N request-end USVDM(s), in which the N is a positive integer; and performing a firmware update operation according to the N request-end USVDM(s) and thereby generating N response-end USVDM(s), and then transmitting the N response-end USVDM(s) to the master-end circuit.

A further embodiment of the IC firmware update method of the present disclosure is performed by a host circuit. This embodiment includes the following steps: communicating with an intermediary circuit to make sure of the intermediary circuit entering a predetermined mode; generating X first protocol request command(s) according to a firmware update procedure and transmitting the X first protocol request command(s) to the intermediary circuit to let the intermediary circuit access a target circuit accordingly, in which the X is a positive integer; and receiving X first protocol response command(s) from the intermediary circuit, in which the content of the X first protocol response command(s) is originated from the target circuit. In a circumstance that a required data access amount of the firmware update procedure is more than K bytes, the X is greater than one and the step of generating the X first protocol request commands includes: generating a plurality of first protocol request commands as the X first protocol request commands according to the firmware update procedure and thereby limiting a required data access amount of each of the X first protocol request commands to the K bytes.

A further embodiment of the IC firmware update method of the present disclosure is performed by a host circuit. This embodiment includes the following steps: communicating with a target circuit through a USB Type-C interface to enter a predetermined mode; generating N request-end USVDM(s) according to a firmware update procedure and transmitting the N request-end USVDM(s) to the target circuit to let the target circuit perform a firmware update operation, in which the N is a positive integer; and receiving N response-end USVDM(s) of the target circuit, in which the N response-end USVDM(s) is/are related to the N request-end USVDM(s). The above-mentioned N request-end USVDM(s) and N response-end USVDM(s) conform to the USB Power Delivery (USB PD) 2.0 protocol.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes an integrated circuit (IC) firmware update device and an IC firmware update method. The device and method can perform a firmware update operation by means of an unstructured vendor defined message (USVDM) via the configuration channel (CC) of a USB Type-C interface based on the USB Power Delivery (USB PD) 2.0 protocol. However, an implementation of the device and method is not limited to the above-mentioned message type, interface, and protocol as long as this implementation is practicable.

Figure 1:
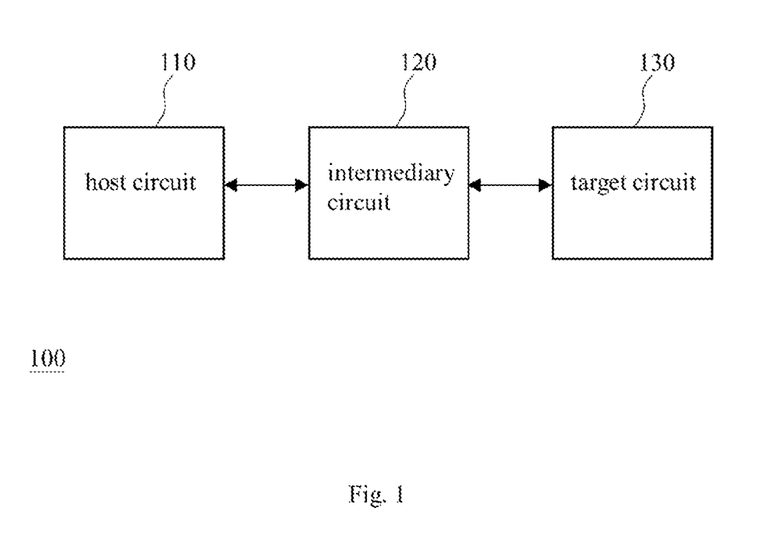
FIG. 1 shows an embodiment of the IC firmware update device of the present disclosure.

FIG. 1 shows an embodiment of the IC firmware update device of the present disclosure. The IC firmware update device 100 of FIG. 1 includes a host circuit 110, an intermediary circuit 120, and a target circuit 130. The host circuit 110 is a circuit of a known or self-developed device (e.g., a computer) and performs communication with a first interface (e.g., an interface other than a USB Type-C interface) according to a first protocol. The host circuit 110 is configured to generate a first protocol request command according to a firmware update procedure and then transmit the first protocol request command to the intermediary circuit 120. An example of the first interface is one of the following: a USB T e-A interface; a USB Type-B interface; a USB Mini-A interface; a USB Mini-B interface; a USB Micro-A interface; a USB Micro-B interface; and a System Management Bus (Smbus) interface. The intermediary circuit 120 is configured to convert the first protocol request command into N request-end USVDM(s) and then transmit the N request-end USVDM(s) to the target circuit 130, in which the N is a positive integer. The intermediary circuit 120 is detailed in a later paragraph. The target circuit 130 is a circuit of a known or self-developed device (e.g., a power supply unit of an electronic device) and performs communication with a second interface (e.g., a USB Type-C interface) according to a second protocol (e.g., the USB PD 2.0 protocol). The target circuit 130 is configured to perform a firmware update operation including a read/write operation in accordance with the N request-end USVDM(s) and thereby generate N response-end USVDM(s), and is configured to transmit the N response-end USVDM(s) to the intermediary circuit 120. In this embodiment, the target circuit 130 does not support the USB PD 3.0 protocol, but the implementation of the present invention is not limited thereto. The operation of the firmware update device 100 is detailed in the method embodiments of later paragraphs.

Figure 2:
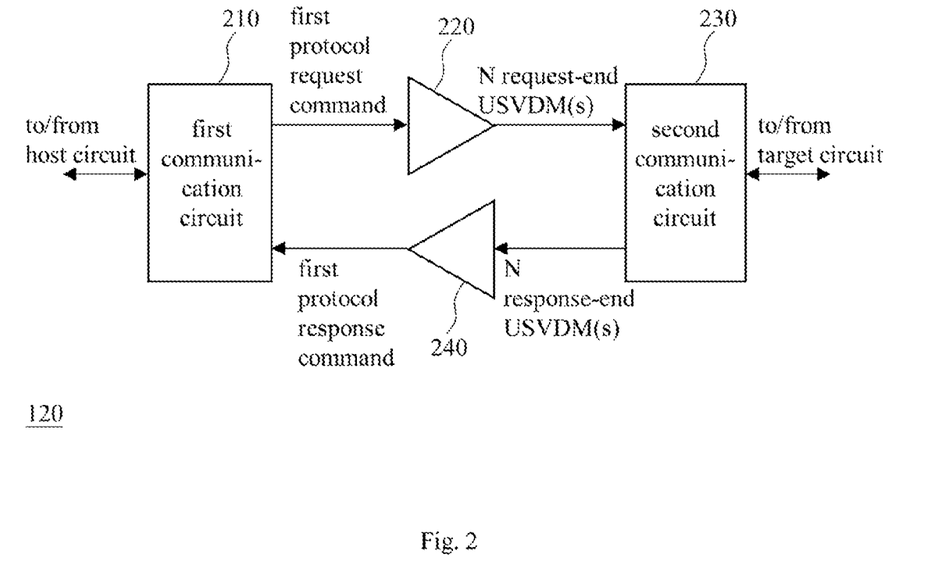
FIG. 2 shows an embodiment of the intermediary circuit of FIG. 1.

FIG. 2 shows an embodiment of the intermediary circuit 120 of FIG. 1 including a first communication circuit 210, a first converting circuit 220, a second communication circuit 230, and a second converting circuit 240. The first communication circuit 210 is configured to receive a first protocol request command of the host circuit 110 via the first interface, and to transmit a first protocol response command to the host circuit 110 via the first interface. The first converting circuit 220 is configured to convert the first protocol request command into N request-end USVDM(s), in which the N is a positive integer. The second communication circuit 230 is configured to transmit the N request-end USVDM(s) to the target circuit 130 via the second interface, and to receive N response-end USVDM(s) of the target circuit 130 via the second interface. The second converting circuit 240 is configured to convert the N response-end USVDM(s) into the first protocol response command according to the second protocol and the first protocol. The operation of the intermediary circuit 120 is detailed in the method embodiments of later paragraphs. It should be noted that the first protocol and second protocol should be known to an implementor; therefore the implementor having ordinary skill in the art can use known or self-developed communication circuits designed for the two protocols as the first and second communication circuits 210, 230 and use known or self-developed converting circuits designed for the protocol conversions as the first and second converting circuits 220, 240.

Figure 3:
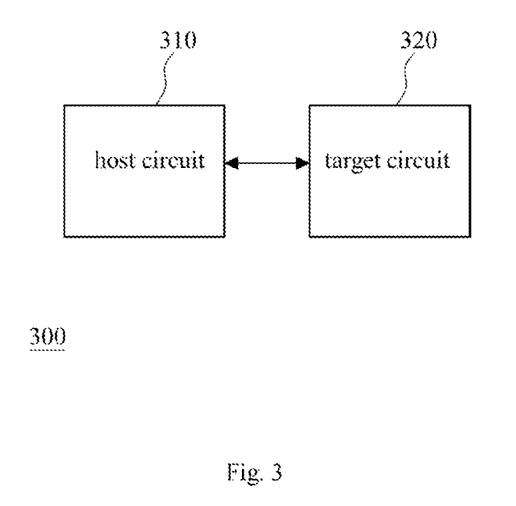
FIG. 3 shows another embodiment of the IC firmware update device of the present disclosure.

FIG. 3 shows another embodiment of the IC firmware update device of the present disclosure. The IC firmware update device 300 of FIG. 3 includes a host circuit 310 and a target circuit 320. The host circuit 310 is a circuit of a known or self-developed device (e.g., a computer) and performs communication with a second interface (e.g., a USB Type-C interface) according to a second protocol (e.g., the USB PD 2.0 protocol). The host circuit 310 is configured to generate N request-end USVDM(s) according to a firmware update procedure and then transmit the N request-end USVDM(s) to the target circuit 320. The target circuit 320 is a circuit of a known or self-developed device (e.g., a power supply unit of an electronic device) and performs communication with the second interface according to the second protocol. The target circuit 320 is configured to perform a firmware update operation including a read/write operation according to the N request-end USVDM(s) and thereby generate N response-end USVDM(s), and then transmit the N response-end USVDM(s) to the host circuit 310. In this embodiment, the target circuit 320 does not support the USB PD 3.0 protocol, but the implementation of the present invention is not limited thereto. The operation of the firmware update device 300 is detailed in the method embodiments of later paragraphs.

Figure 4:
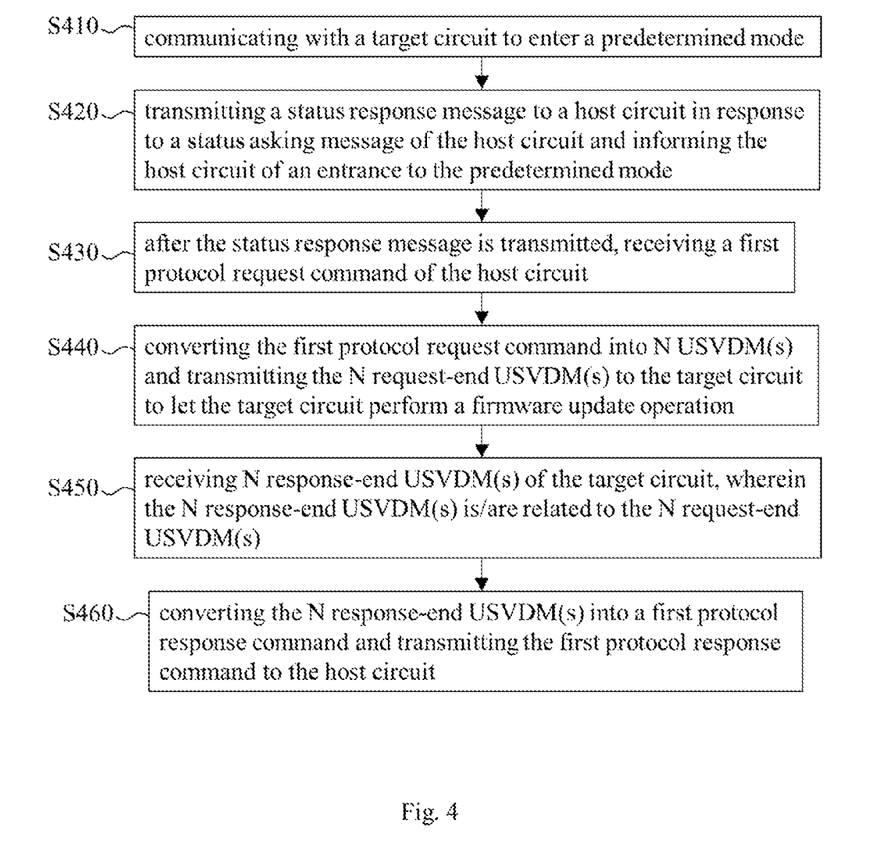
FIG. 4 shows an embodiment of the IC firmware update method of the present disclosure.
Figure 5:
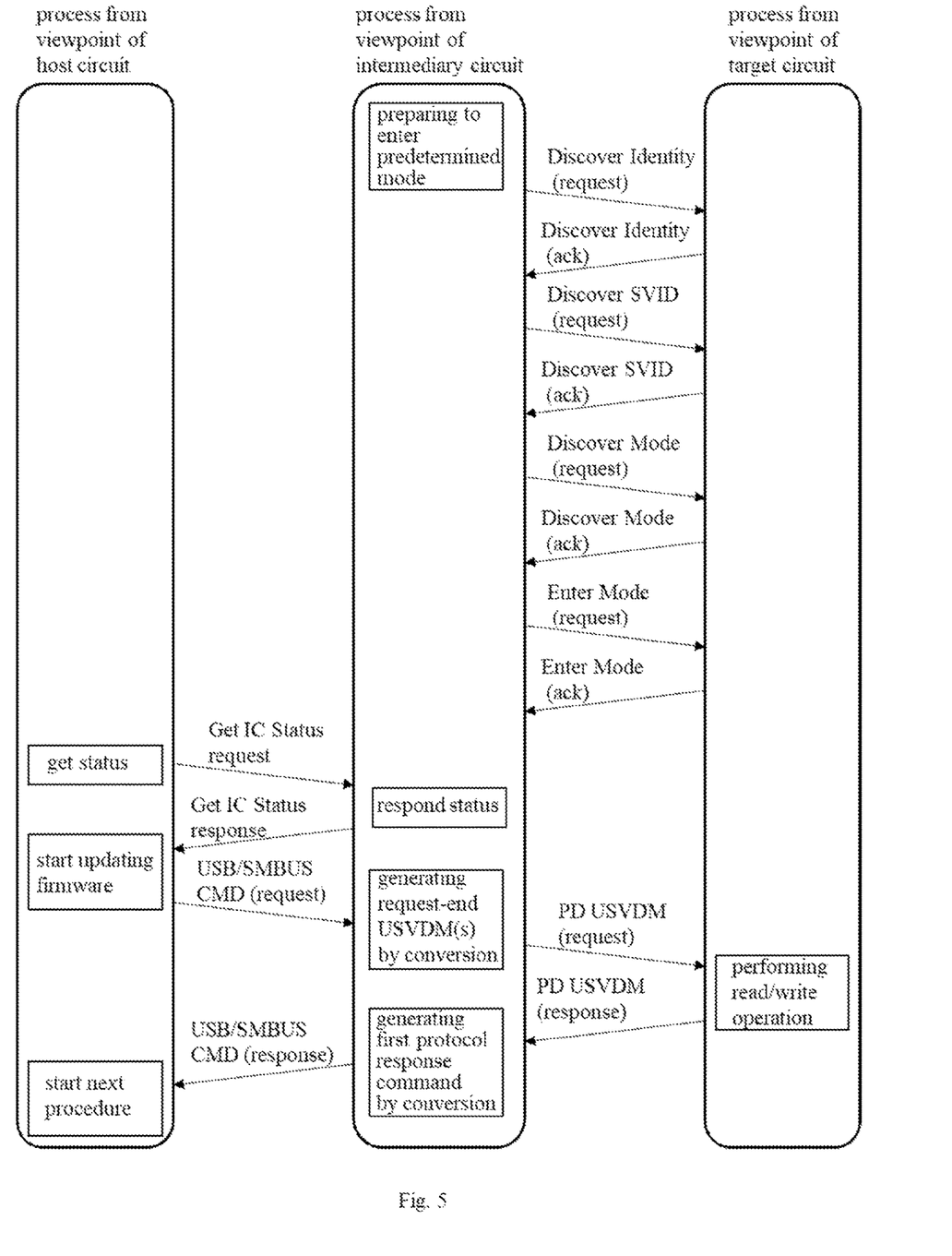
FIG. 5 shows a flowchart illustrating the embodiment of FIG. 4.

FIG. 4 shows an embodiment of the IC firmware update method of the present disclosure. This embodiment is performed by an intermediary circuit (e.g., the intermediary circuit 120 of FIG. 2) and includes the following steps:

step S410: communicating with a target circuit to enter a predetermined mode. An example of the target circuit is the target circuit 130 of FIG. 1. In an exemplary implementation, the predetermined mode is the Modal Operation mode; in order to enter the Modal Operation mode, the process of communicating with the target circuit as shown in FIG. 5 includes: a request to discover an identity (Discover Identity (request)); an acknowledgement of the request to discover the identity (Discover Identity (ack)); a request to discover a standard or vendor ID (SVID) (Discover SVID (request)); an acknowledgement of the request to discover the SVID (Discover SVID (ack)); a request to discover a mode (Discover Mode (request)); an acknowledgement of the request to discover the mode (Discover Mode (ack)); a request to ask the target circuit to enter the mode (Enter Mode (request)); and an acknowledgement of the request to ask the target circuit to enter the mode (Enter Mode (ack)).

step S420: transmitting a status response message to a host circuit in response to a status asking message of the host circuit and thereby informing the host circuit of an entrance to the predetermined mode. An example of the host circuit is the host circuit 110 of FIG. 1. In an exemplary implementation, the status asking message is a command for inquiring the status of USB/Smbus (USB/SMBUS CMD (Get IC Status request)) and the status response message is a command for responding the status of USB/Smbus (USB/SMBUS CMD (Get IC status response)) as shown in FIG. 5, wherein the term "USB" here means conventional USB (i.e., non-USB Type-C). Since those having ordinary skill in the art can appreciate the way to process the status asking message and the way to generate the status response message according to a known protocol (e.g., the USB/Smbus protocol), which is for the communication between the intermediary circuit and host circuit, and known techniques (e.g., techniques used for generating packets according to one or more protocols), repeated and redundant description is omitted here.

step S430: after the status response message is transmitted, receiving a first protocol request command of the host circuit. In an exemplary implementation, the first protocol request command is a USB/Smbus request command (USB/SMBUS CMD (request)) as shown in FIG. 5; this command is used for requesting the execution of the write/read operation. Since those having ordinary skill in the art can appreciate the way to process the first protocol request command according to a known protocol (e.g., the USB/Smbus protocol), which is for the communication between the intermediary circuit and host circuit, and known techniques (e.g., techniques used for generating packets according to one or more protocols), repeated and redundant description is omitted here.

step S440: converting the first protocol request command into N USVDM(s) and transmitting the N request-end USVDM(s) to the target circuit to let the target circuit perform a firmware update operation, in which the N is a positive integer. In an exemplary implementation, the N request-end USVDM(s) is/are USVDM(s) conforming to the USB PD 2.0 protocol (PD USVDM (request)) as shown in FIG. 5.

Figure 6:
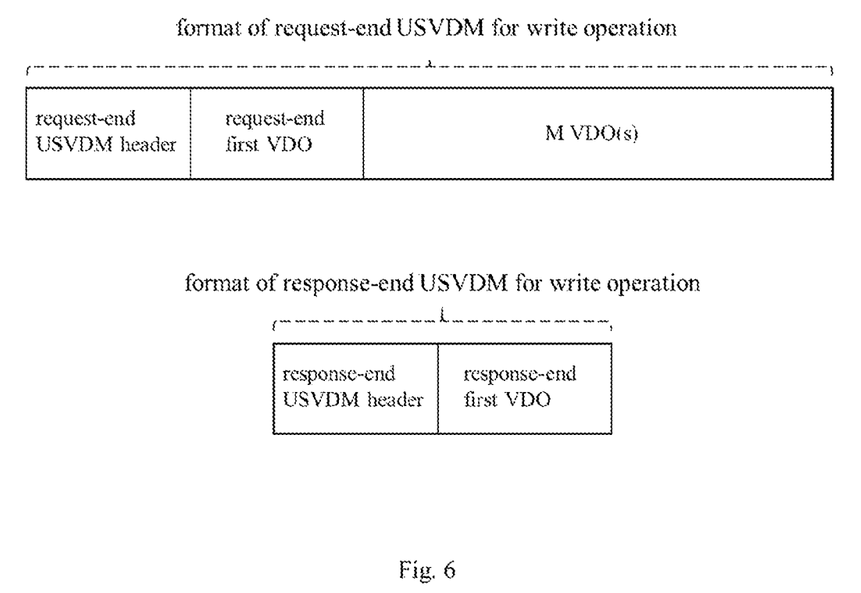
FIG. 6 shows an example of the format of the N request-end/response-end USVDM(s) of FIG. 4 for a write operation.

FIG. 6 shows an example of the format of each of the N request-end USVDM(s) for the write operation; this example includes a USVDM header for carrying the information of the USVDM; a request-end first vendor defined data object (VDO) for carrying one or more write parameters, and M VDO(s) for carrying data to be written in. In an exemplary implementation of FIG. 6, the length of the request-end USVDM header is four bytes (i.e., 32 bits), the $16^{th}$~$31^{st}$ bits of the four bytes are used to disclose the vendor ID, the $15^{th}$ bit of the four bytes is used to disclose the vendor defined message type (VDM type), the $8^{th}$~$14^{th}$ bits of the four bytes are reserved bits, and the $0^{th}$~$7^{th}$ bits of the four bytes are used to express the request command(s) for writing data into the storage circuit (e.g., a flash memory) of the target circuit. In the same implementation, the length of the request-end first VDO is four bytes, the $24^{th}$~$31^{st}$ bits of the four bytes are used to indicate the length of the data to be written in, and the $0^{th}$~$23^{rd}$ bits of the four bytes are used to indicate the beginning address for the write operation. In the same implementation, the length of each of the M VDO(s) is four bytes, and the M is a positive integer such as a positive integer equal to or smaller than five so that the length of the M VDO(s) is equal to or shorter than 20 bytes to comply with the USB PD 2.0 specification.

Figure 7:
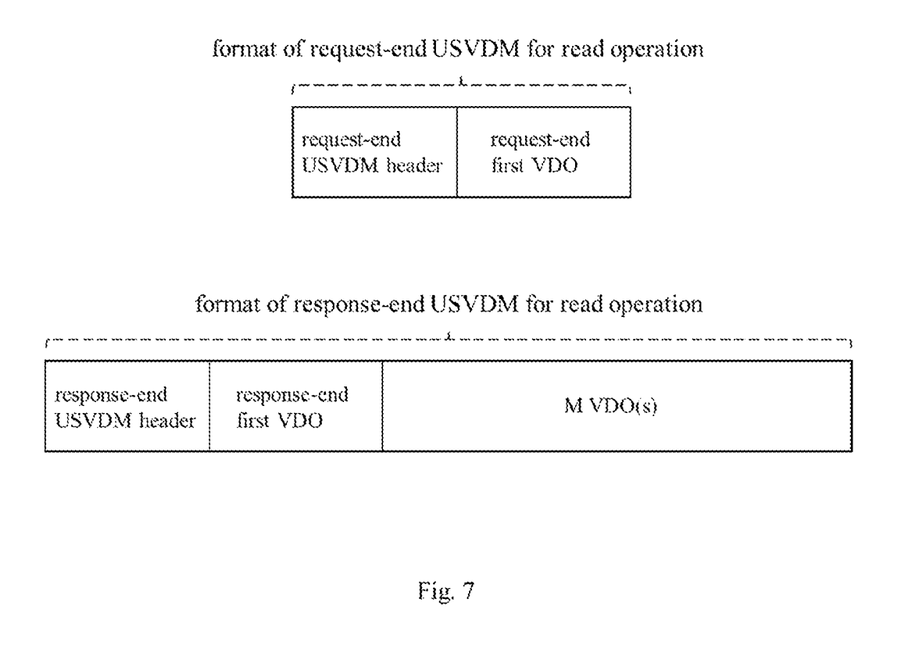
FIG. 7 shows an example of the format of the N request-end/response-end USVDM(s) of FIG. 4 for a read operation.

FIG. 7 shows an example of the format of each of the N request-end USVDM(s) for the read operation; this example includes a USVDM header for carrying the information of the USVDM, and a request-end first VDO for carrying one or more write parameters. In an exemplary implementation of FIG. 7, the length of the request-end USVDM header is four bytes (i.e., 32 bits), the $16^{th}$~$31^{th}$ bits of the four bytes are used to disclose the vendor ID, the $15^{th}$ bit of the four bytes is used to disclose the VDM type, the $8^{th}$~$14^{th}$ bits of the four bytes are reserved bits, and the $0^{th}$~$7^{th}$ bits of the four bytes are used to express the request command(s) for reading data from the storage circuit (e.g., a flash memory) of the target circuit. In the same implementation, the length of the request-end first VDO is four bytes, the $24^{th}$~$31^{st}$ bits of the four bytes are used to indicate the length of the data to be read, and the $0^{th}$~$23^{rd}$ bits of the four bytes are used to indicate the beginning address for the read operation.

step S450: receiving N response-end USVDM(s) of the target circuit, in which the N response-end USVDM(s) is/are related to the N request-end USVDM(s). In an exemplary implementation, the N response-end USVDM(s) is/are USVDM(s) conforming to the USB PD 2.0 protocol (PD USVDM (response)) as shown in FIG. 5.

FIG. 6 shows an example of the format of each of the N response-end USVDM(s) for the write operation; this example includes a USVDM header for carrying the information of the USVDM and a response-end first VDO for carrying one or more write parameters. In an exemplary implementation of FIG. 6, the response-end USVDM header is similar to the aforementioned request-end USVDM header for the write operation, and the only difference between them is that the $0^{th}$~$7^{th}$ bits of the response-end USVDM header are used to express the response command(s) in regard to the operation of writing data into the target circuit. In the same implementation, the length of the response-end first VDO is four bytes, the $8^{th}$~$31^{st}$ bits of the four bytes are reserved bits, and the $0^{th}$~$7^{th}$ bits of the four bytes are used to show the result of the write operation.

FIG. 7 shows an example of the format of each of the N response-end USVDM(s) for the read operation; this example includes a USVDM header for carrying the information of the USVDM, a response-end first VDO for carrying one or more read parameters, and M VDO(s) for carrying data read from the target circuit. In an exemplary implementation of FIG. 7, the length of the response-end USVDM header is similar to the request-end USVDM header for the read operation, and the only difference between them is that the $0^{th}$~$7^{th}$ bits of the response-end USVDM header are used to express the response command(s) in regard to the operation of reading data from the target circuit. In the same implementation, the length of the response-end first VDO is four bytes, the $24^{th}$~$31^{st}$ bits of the four bytes are used to indicate the length of the data read from the target circuit, the $8^{th}$~$23^{rd}$ bits of the four bytes are reserved bits, and the $0^{th}$~$7^{th}$ bits of the four bytes are used to show the result of the read operation. In the same implementation, the length of each of the M VDO(s) is four bytes, the M is a positive integer such as a positive integer equal to or smaller than five so that the length of the M VDO(s) is equal to or shorter than 20 bytes to comply with the USB PD 2.0 specification.

step S460: converting the N response-end USVDM(s) into a first protocol response command and transmitting the first protocol response command to the host circuit. In an exemplary implementation, the first protocol response command is a USB/Smbus response command (USB/SMBUS CMD (response)) as shown in FIG. 5; this command is used for responding to the request of the data write/read operation; in addition, after receiving the first protocol response command, the host circuit can start preparing the next procedure. Since those having ordinary skill in the art can appreciate the way to generate the first protocol request command according to a known protocol (e.g., the USB/Smbus protocol), which is for the communication between the intermediary circuit and host circuit, and known techniques (e.g., techniques used for generating packets according to one or more protocols), repeated and redundant description is omitted here.

Please refer to FIGS. 4-5. In an exemplary implementation, the intermediary circuit communicates with the target circuit through the configuration channel of a USB Type-C interface. This communication uses Bi-Phase Mark Code; therefore, the code type of the N request-end USVDM(s) and the N response-end USVDM(s) is Bi-phase Mark Code. In an exemplary implementation, if a required data access amount of the first protocol request command is more than K bytes (e.g., 20 bytes), in order to prevent a required data access amount of each of the N request-end USVDM(s) from exceeding K bytes based on the protocol (e.g., the USB PD 2.0 protocol) for the communication between the target circuit and the intermediary circuit, the intermediary circuit not only performs the steps of FIG. 4 but also performs the steps as follows: dividing the first protocol request command into partition commands; and then converting each of the partition commands into the N request-end USVDMs, wherein the K is greater than one, a required data access amount of each of the partition commands is not more than the K bytes, the N is an integer greater than one, and the N response-end USVDMs are related to the N request-end USVDMs respectively. In an exemplary implementation, the target circuit does not support the USB PD 3.0 protocol but support the USB PD 2.0 protocol, and the intermediary circuit and the target circuit function as a downstream facing port (DFP) and an upstream facing port (UFP) respectively.

Figure 8:
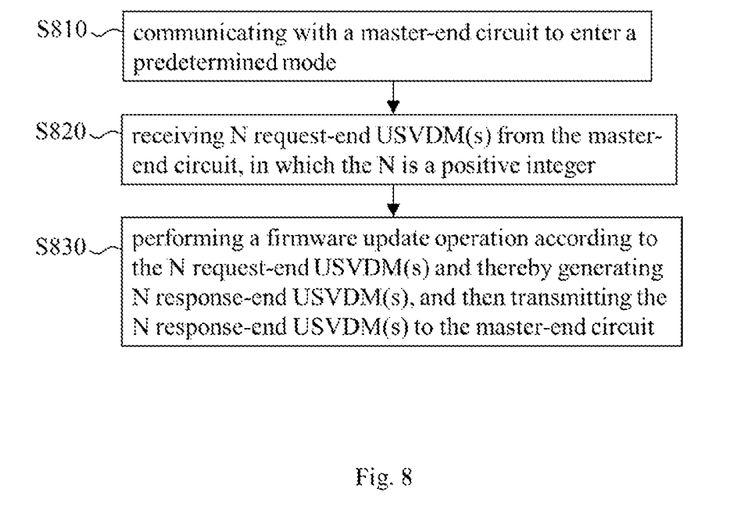
FIG. 8 shows another embodiment of the IC firmware update method of the present disclosure.

FIG. 8 shows another embodiment of the IC firmware update method of the present disclosure. This embodiment is performed by a target circuit (e.g., the target circuit 130 of FIG. 1 or FIG. 3) and includes the following steps:

step S810: communicating with a master-end circuit (e.g., the intermediary circuit 120 of FIG. 1 or the host circuit 310 of FIG. 3) to enter a predetermined mode (e.g., the Modal Operation mode).

step S820: receiving N request-end USVDM(s) from the master-end circuit, in which the N is a positive integer.

step S830: performing a firmware update operation according to the N request-end USVDM(s) and thereby generating N response-end USVDM(s), and then transmitting the N response-end USVDM(s) to the master-end circuit.

Figure 9:
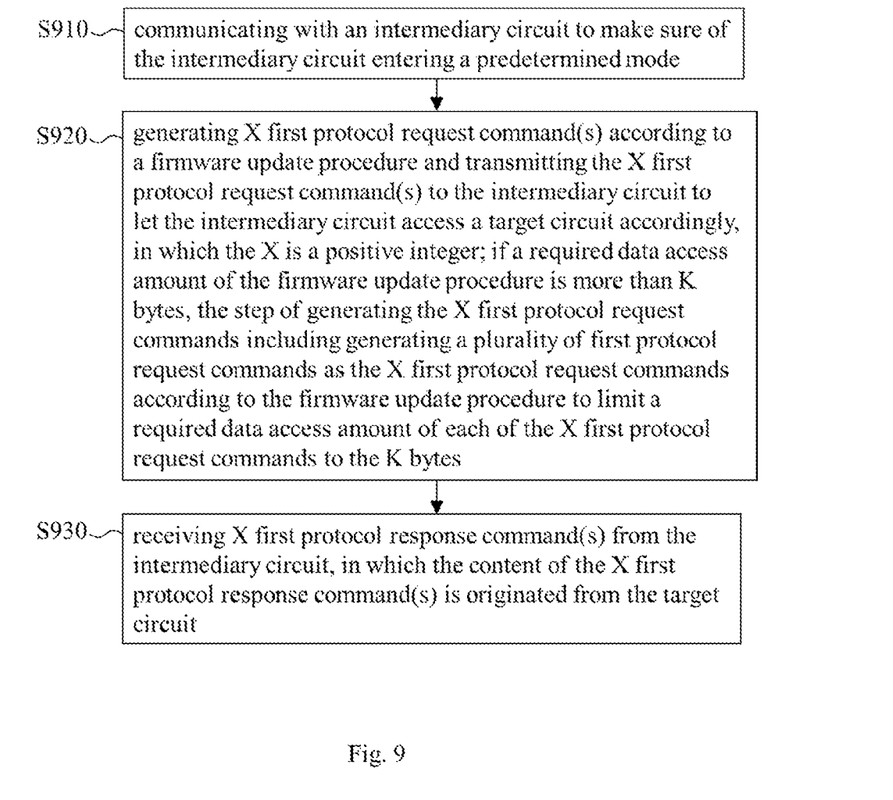
FIG. 9 shows yet another embodiment of the IC firmware update method of the present disclosure.

FIG. 9 shows yet another embodiment of the IC firmware update method of the present disclosure. This embodiment is performed by a host circuit (e.g., the host circuit 110 of FIG. 1) and includes the following steps:

step S910: communicating with an intermediary circuit (e.g., the intermediary circuit 120 of FIG. 1) to make sure of the intermediary circuit entering a predetermined mode.

step S920: generating X first protocol request command(s) according to a firmware update procedure and transmitting the X first protocol request command(s) to the intermediary circuit to let the intermediary circuit access a target circuit accordingly, in which the X is a positive integer. In a circumstance that a required data access amount of the firmware update procedure is more than K bytes, the X is greater than one and the step of generating the X first protocol request commands includes: generating a plurality of first protocol request commands as the X first protocol request commands according to the firmware update procedure and thereby limiting a required data access amount of each of the X first protocol request commands to the K bytes.

step S930: receiving X first protocol response command(s) from the intermediary circuit, in which the content of the X first protocol response command(s) is originated from the target circuit.

Figure 10:
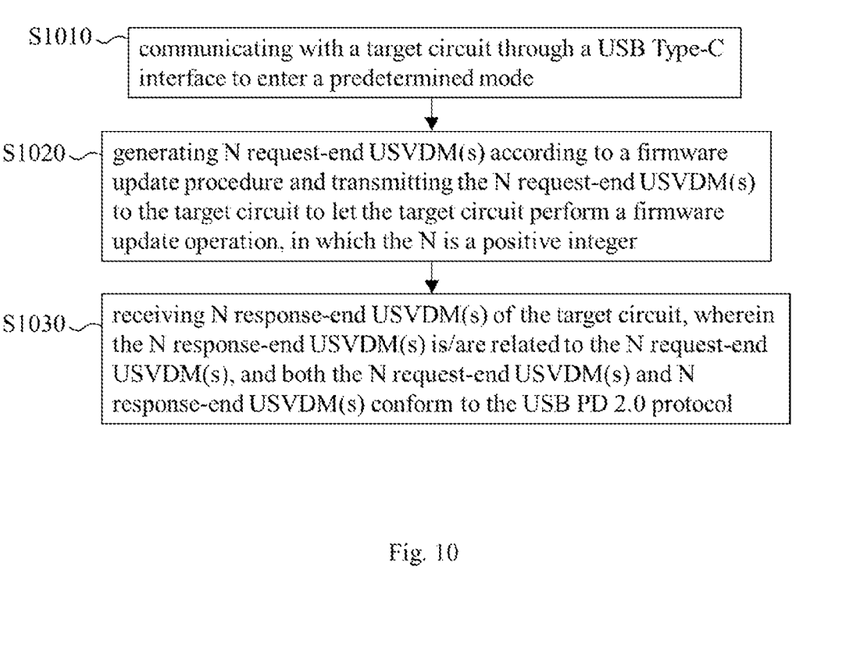
FIG. 10 shows a further embodiment of the IC firmware update method of the present disclosure.
Figure 11:
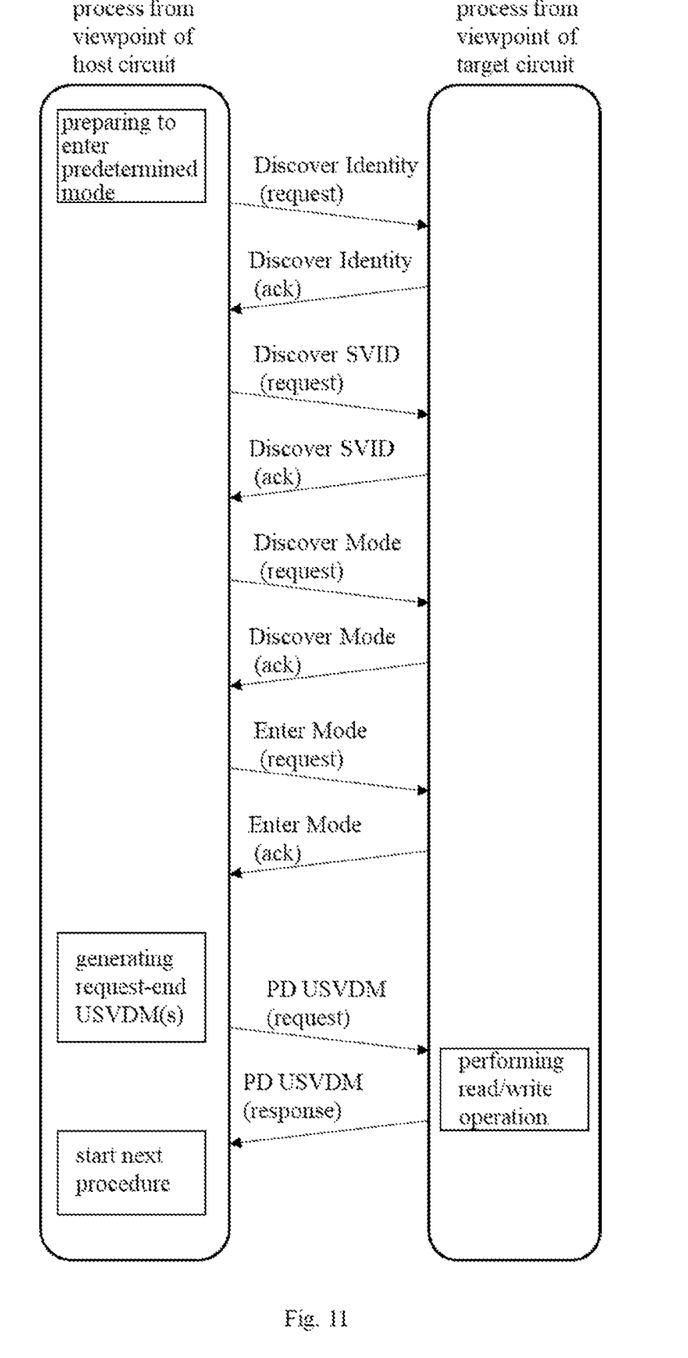
FIG. 11 shows a flowchart illustrating the embodiment of FIG. 10.

FIG. 10 shows a further embodiment of the IC firmware update method of the present disclosure. This embodiment is performed by a host circuit (e.g., the host circuit 310 of FIG. 3) and includes the following steps:

step S1010: communicating with a target circuit (e.g., the target circuit 320 of FIG. 3) through a USB Type-C interface to enter a predetermined mode (e.g., the Modal Operation mode). It should be noted that in order to enter the Modal Operation mode, the process from "Discover Identity (request)" to "Enter Mode (ack)" as shown FIG. 11 is required; this process is also found in FIG. 5.

step S1020: generating N request-end USVDM(s) according to a firmware update procedure and transmitting the N request-end USVDM(s) to the target circuit to let the target circuit perform a firmware update operation, in which the N is a positive integer. In an exemplary implementation, the N request-end USVDM(s) is/are USVDM(s) conforming to the USB PD 2.0 protocol (PD USVDM (request)) as shown in FIG. 11.

step S1030: receiving N response-end USVDM(s) of the target circuit, in which the N response-end USVDM(s) is/are related to the N request-end USVDM(s), and both the N request-end USVDM(s) and N response-end USVDM(s) conform to the USB PD 2.0 protocol. In an exemplary implementation, the N response-end USVDM(s) is/are USVDM(s) conforming to the USB PD 2.0 protocol (PD USVDM (response)) as shown in FIG. 11.

Since those having ordinary skill in the art can appreciate the detail and modification of the embodiments of FIGS. 8-11 by referring to the disclosure of the embodiments of FIGS. 1-7, which implies that some or all of the features of the embodiments of FIGS. 1-7 can be applied to the embodiments of FIGS. 8-11 in a reasonable way, repeated and redundant description is omitted here. Please note that some terms (e.g., USVDM, configuration channel, Smbus, Modal Operation, VDO, Bi-phase Mark Code, DFP, UFP, and so on) in this specification are known and well-defined in this technical field, and their detail is found in the USB PD 2.0/3.0 specification and the relevant literatures.

It should be noted that people of ordinary skill in the art can selectively using some or all of the features of any embodiment in this specification or selectively using some or all of the features of multiple embodiments in this specification to implement the present invention as long as such implementation is practicable, which implies that the way to carry out the present invention can be flexible.

To sum up, the device and method of the present disclosure can use the USVDM(s) having the content defined by the present disclosure to update the firmware of a target circuit through the configuration channel of a USB Type-C interface based on the USB PD 2.0 protocol, even though the target circuit does not support the USB PD 3.0 protocol.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An IC firmware update method performed by an intermediary circuit, comprising:
   communicating with a target circuit to enter a predetermined mode;
   transmitting a status response message to a host circuit in response to a status asking message of the host circuit and thereby informing the host circuit of an entrance to the predetermined mode;
   after the status response message is transmitted, receiving a first protocol request command of the host circuit;
   converting the first protocol request command into N request-end unstructured vendor defined message(s) (USVDM(s)) and then transmitting the N request-end USVDM(s) to the target circuit to let the target circuit perform a firmware update operation, in which the N is a positive integer;
   receiving N response-end USVDM(s) of the target circuit, in which the N response-end USVDM(s) is/are related to the N request-end USVDM(s); and
   converting the N response-end USVDM(s) into a first protocol response command and transmitting the first protocol response command to the host circuit.

2. The IC firmware update method of claim 1, wherein the intermediary circuit communicates with the target circuit with a USB Type-C interface and communicates with the host circuit with a non-USB Type-C interface.

3. The IC firmware update method of claim 2, wherein the non-USB Type-C interface is one of following interfaces: a USB Type-A interface; a USB Type-B interface; a USB Mini-A interface; a USB Mini-B interface; a USB Micro-A interface; a USB Micro-B interface; and a System Management Bus (Smbus) interface.

4. The IC firmware update method of claim 1, further comprising: in a circumstance that a required data access amount of the first protocol request command is more than K bytes, dividing the first protocol request command into partition commands, and then converting each of the partition commands into the N request-end USVDMs, wherein the K is greater than one, a required data access amount of each of the partition commands is not more than the K bytes, the N is an integer greater than one, and the N response-end USVDMs are related to the N request-end USVDMs respectively.

5. The IC firmware update method of claim 1, wherein in a circumstance that the N request-end USVMD(s) is/are for a write operation, a format of the N request-end USVDM(s) includes a request-end USVDM header, a request-end first vendor defined data object (VDO) for carrying at least one request-end write parameter, and M VDO(s) for carrying data, in which the M is a positive integer; and in the circumstance, a format of the N response-end USVDM(s) includes a response-end USVDM header and a response-end first VDO for carrying at least one response-end write parameter.

6. The IC firmware update method of claim 1, wherein in a circumstance that the N request-end USVMD(s) is/are for a read operation, a format of the N request-end USVDM(s) includes a request-end USVDM header and a request-end first vendor defined data object (VDO) for carrying at least one request-end read parameter; and in the circumstance, a format of the N response-end USVDM(s) includes a response-end USVDM header, a response-end first VDO for carrying at least one response-end read parameter, and M VDO(s) for carrying data, in which the M is a positive integer.

7. The IC firmware update method of claim 1, wherein the target circuit does not support a USB Power Delivery (USB PD) 3.0 protocol but supports a USB PD 2.0 protocol, and both the N request-end USVDM(s) and the N response-end USVDM(s) conform to the USB PD 2.0 protocol.

8. The IC firmware update method of claim 7, wherein the predetermined mode is a Modal Operation mode.

9. The IC firmware update method of claim 7, wherein the intermediary circuit and the target circuit function as a downstream facing port (DFP) and an upstream facing port (UFP) respectively.

* * * * *